United States Patent [19]

Pietrorazio

[11] Patent Number: 4,938,679
[45] Date of Patent: Jul. 3, 1990

[54] COLLAPSIBLE CORE FOR MOLDING CLOSURES HAVING INTERRUPTED INTERIOR THREADS AND THE LIKE

[75] Inventor: Joseph A. Pietrorazio, Middlebury, Conn.

[73] Assignee: Cores Unlimited, a partnership, Woodbury, Conn.

[21] Appl. No.: 354,124

[22] Filed: May 18, 1989

[51] Int. Cl.$^5$ ............................ B28B 7/10; B28B 7/30
[52] U.S. Cl. ...................................... 425/437; 249/59; 249/66.1; 249/180; 249/184; 425/577; 425/DIG. 58; 425/809
[58] Field of Search ................ 249/59, 184, 180, 152, 249/178, 66, 63; 425/DIG. 58, 417, 438, 577, 809

[56] References Cited

U.S. PATENT DOCUMENTS

| | | | |
|---|---|---|---|
| 3,618,170 | 11/1971 | Owens | 249/59 |
| 3,679,339 | 7/1972 | Tucker | 425/441 |
| 3,865,529 | 2/1975 | Guzzo | 249/180 |
| 4,019,711 | 4/1977 | Altenhof et al. | 249/59 |
| 4,130,264 | 12/1978 | Schröer | 425/417 |
| 4,206,799 | 6/1980 | McDonald | 425/577 |
| 4,327,051 | 4/1982 | Edmondson | 249/180 |
| 4,533,312 | 8/1985 | Von Holdt | 249/180 |
| 4,552,318 | 11/1985 | Dutt et al. | 249/59 |
| 4,618,121 | 10/1986 | Conti | 249/59 |
| 4,676,732 | 6/1987 | Letica | 249/184 |
| 4,854,849 | 8/1989 | Sudo | 425/DIG. 58 |

FOREIGN PATENT DOCUMENTS

| | | | |
|---|---|---|---|
| 508344 | 10/1952 | Belgium | 249/59 |
| 63-9967 | 3/1988 | Japan | 425/441 |

Primary Examiner—Jay H. Woo
Assistant Examiner—K. P. Nguyen
Attorney, Agent, or Firm—Dallett Hoopes

[57] ABSTRACT

A male mold member includes a base or body having a central projecting core with an intermediate peripheral tapered seat between the core and body. The body, seat and core are intercepted by a plurality of cylindrical bores spaced uniformly about the male mold member and inclined toward the core axis. The bores receive core blades having cylindrical bodies. The core blades are exteriorly shaped in the area of the core to form sections which continue the contour of the core and seat. The blades may each have a thread matrix in the core area. After molding, a stripper bushing, engaging the molded product, pushes the product along with the core blades to a position at which the core blades are collapsed so that the product may be stripped. In the molding position the stripper bushing has a tapered bore opening which fits snugly against the tapered seat portions on the blades to orient the blades to proper position and immobilize them.

9 Claims, 3 Drawing Sheets

COLLAPSIBLE CORE FOR MOLDING CLOSURES HAVING INTERRUPTED INTERIOR THREADS AND THE LIKE

BACKGROUND OF THE INVENTION

1. Field of the Invention

This invention relates to collapsible cores. More specifically, this invention relates to collapsible cores useful in the molding of threaded plastic closures. Still more specifically, this invention relates to collapsible cores useful for molding threaded closures in which the threads are in the form of a plurality of thread segments. It is also useful for other undercut products.

2. Description of the Prior Art

In the prior art there are a number of patents showing collapsible cores used in making threaded closures. By means of such collapsible cores it is not necessary once a threaded cap, for instance, is molded to "unscrew" it from its core; instead the core is collapsed and the threaded closure is simply stripped off the collapsed core.

Some examples in the prior art include, for instance, U.S. Pat. No. 3,618,170, E. W. Owens, granted Nov. 9, 1971, which shows a collapsible core presenting a pair of core portions which are held in proper molding relation by an actuator, the sides of which have non-threaded segments. Once the closure is molded, the actuator is withdrawn and the portions of the core are permitted to collapse inward so that the closure may be readily stripped.

Another example of a collapsible core is disclosed in U.S. Pat. No. 4,019,711 to J. Altenhof et al which issued Apr. 26, 1977. In this patent a plurality of thread-molding segments ride in grooves on the core. These segments have threaded sides. Once the closure is molded, the segments will move longitudinally of the core on an incline so that when the segments are fully extended, their diameter is reduced and the closure may be stripped to provide a closure having segmented threads.

A still further example of a collapsible core is shown in the U.S. Pat. No. 4,130,264 to Schroer which issued Dec. 19, 1978. In this patent there are a plurality of segments about the periphery of the core. The segments, once the molding is complete, move on tracks at different inclinations so that the core, when collapsed, may be easily stripped. The product in this instance is a closure having threads on its inside all the way around.

SUMMARY OF THE INVENTION

Under the present invention the male member comprises a body having an upstanding cylindrical core, with a tapered seat inbetween the body and core. The core, seat and body are intercepted by a plurality of cylindrical bores uniformly disposed about the center axis. Blades having cylindrical bodies ride in the bores and are shaped in the area of the tapered seat and cylindrical core to form components which continue those shapes. The blade components may have thread segment matrices on their outer surfaces so that the final closure has interrupted interior thread segments.

There are advantages to the structure now presented. Because the bores and bodies of the blades are cylindrical, there is great precision in the positioning of the blades. This precision is enhanced by the presence of a stripper bushing which has a tapered bore having an inner surface comforming to the tapered seat so that when the bushing is in place, it holds the blades exactly where they should be.

In addition, because the cylindrical bores can incline toward the axis steeply and still guide the blades firmly, the stroke of the blades from molding position to collapsed position can be quite short. This will use up less room within the mold platens than the collapsible cores of the prior art. Thus, under the present invention the shortness of the male mold member and its movement make possible a "stacking" of a plurality of molding units between the platens of the mold press.

BRIEF DESCRIPTION OF THE DRAWINGS

Other features and objects of the invention will be apparent from references to the accompanying drawings and the specification including claims, all of which disclose a non-limiting embodiment of the invention. In the drawings:

DESCRIPTION OF THE PREFERRED EMBODIMENT

Figures 1, 2:
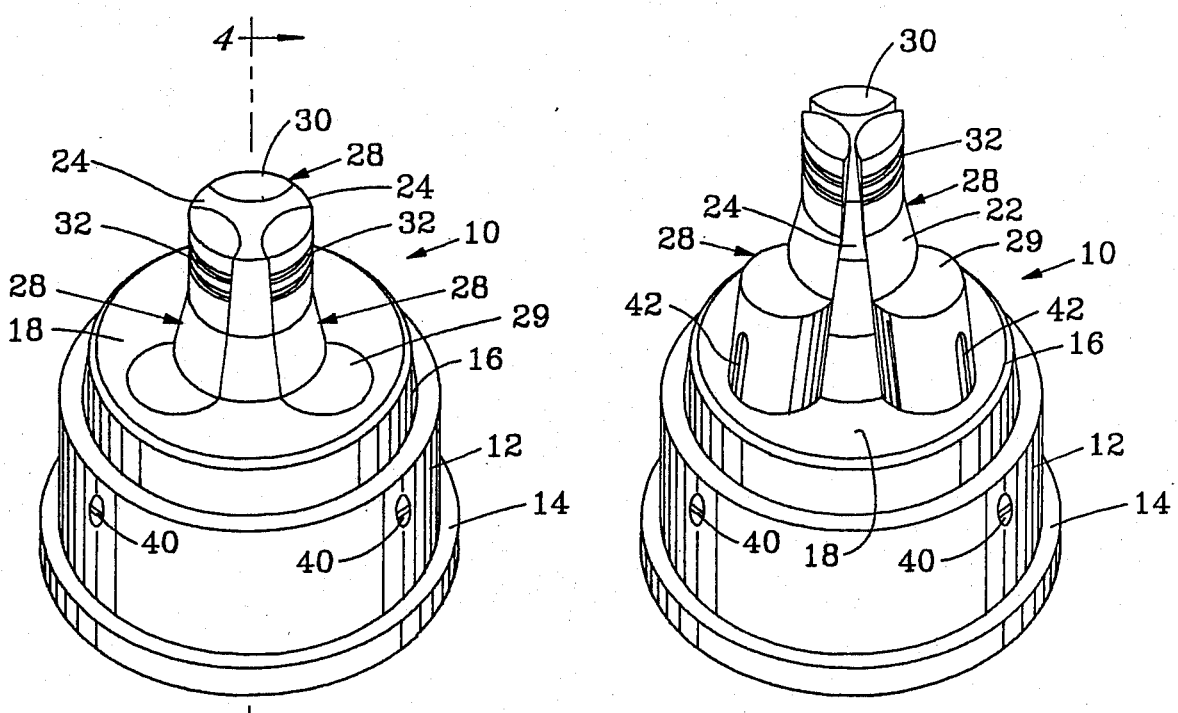
FIG. 1 is a perspective view from above of a male mold member including the body and core embodying the invention and is shown in molding position.
FIG. 2 is a view similar to FIG. 1 but showing the blades extending so that the member is in collapsed condition.

Referring more specifically to the drawings, a collapsible mold member embodying the invention is generally designated 10 in FIG. 1. It comprises a body or base 12, cylindrical in shape having a head 14. The body is stepped inward at its upper end to present a tapered riser 16. The body presents a front face 18 from the center of which extends upwardly a core 20.

Intermediate the core 20 and the body 12 is a tapered seat 22.

As shown, the body 12, seat 22 and mold member part 24 of the core are intercepted by cylindrical bores 26 which extend from the bottom of the body (FIG. 3) upward out through the face 18 and scooping into the seat 22 and the core part 24.

The bores 26 have respectively disposed therein blades 28 having cylindrical bodies 28a. At their outer ends the blades are reduced in their outer dimension to present shoulders 29 and have sections 30 which conform with the shape of the cylindrical core 24 and the seat 22. On their exterior surface the blade sections 30 are formed with grooves 32 which comprise the matrices for thread segments. (The resulting threads appear in the final closure product as segments of threads T (FIG. 3).)

Figure 3:
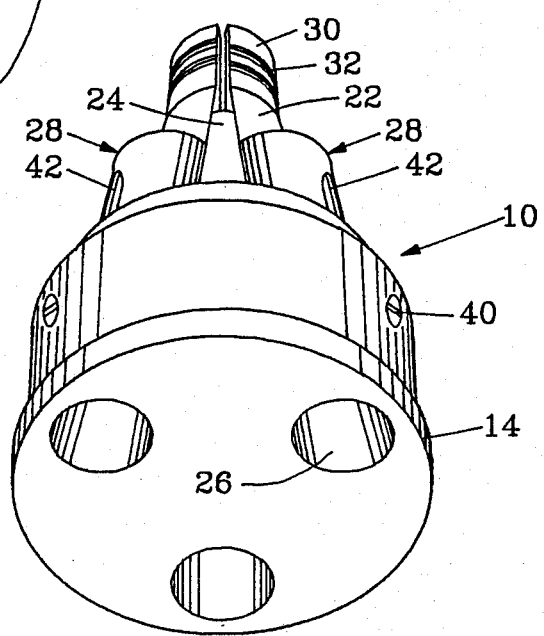
FIG. 3 is a prospective view taken from underneath the member and showing the member in collapsed position and a closure C having been stripped from the member.
Figure 4:
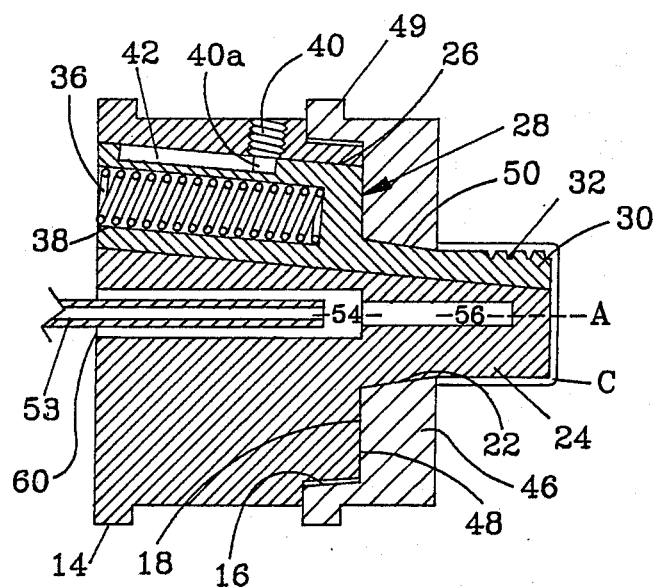
FIG. 4 is a sectional view taken on the line 4—4 of FIG. 1 and including the stripper bushing in place.
Figure 7:
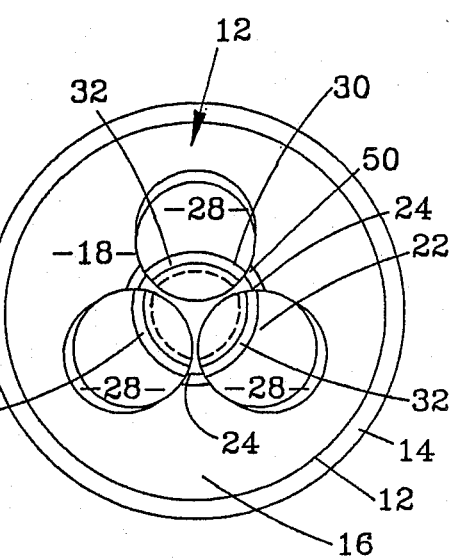
FIG. 7 is a top plan view of the core collapsed as in FIG. 6 but with the stripper bushing removed.

As shown best in FIG. 4 the cylindrical bores 26 incline from the back 15 of the base body inwardly toward the center axis A of the core (FIG. 4). As a result, when the blades 28 are extended (FIGS. 2, 3 and 7), the core collapses, that is, the outer effective diameter of the blade components 30 in the cylindrical area 24 is reduced so that the molded closure C can be readily stripped therefrom.

The molded closure as shown in FIG. 3 is a cap C which has thread segments T formed inside the cap alternating with non-thread segments, all reflecting the configuration of the composite cylindrical core 24 including the blade sections 30. The stationary parts of the core 24 (between the blade sections 30) are not formed with any thread matrix 32.

The male mold assembly includes helper springs 36 which are disposed in recesses 38 inside the cylindrical bodies of the blades. Guide screws 40 are disposed in threaded openings in the side of the body and have reduced ends 40a which ride in slots 42 in the blades 28 respectively. The guide screw 40 and slot 42 arrangment assures that there will be little rotation of the blades 28 as they move in and out.

when the male mold member is in molding position (FIG. 4) it is snugly surrounded by a stripper bushing 46 which has an inner face 48 which seats against the face 18 of the mold member. The stripper bushing 46 has an outward mounting head 49 and a bore opening 50 which is tapered to exactly complement the seat 22 on the member. As a result, when the core is in molding position and the stripper bushing 46 is tight against the face 18 of the mold body, it forceably contacts the tapered seat 22, assuring absolute correct orientation and immobility of the blades 28 in the core 24.

As shown in FIG. 4, the member 10 may be cooled by liquid passing through a central recess 54 which is stepped down as at 56 in the front end of the core. A coolant supply tube 58 extends into the recess 54 on its axis so that coolant liquid may be supplied therethrough and circulate in the recess 54, 56 to discharge out opening 60 in the bottom of the body.

OPERATION OF THE MOLD

Figure 8:
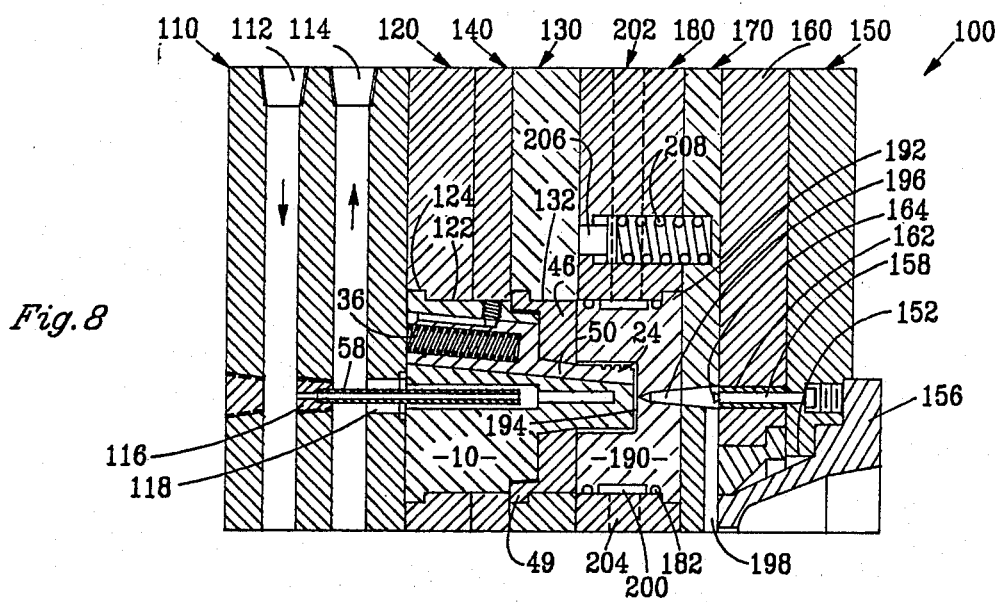
FIG. 8 is a sectional view through the parts of a mold base including the collapsible member of the invention and showing the mold member in molding position.
Figure 9:
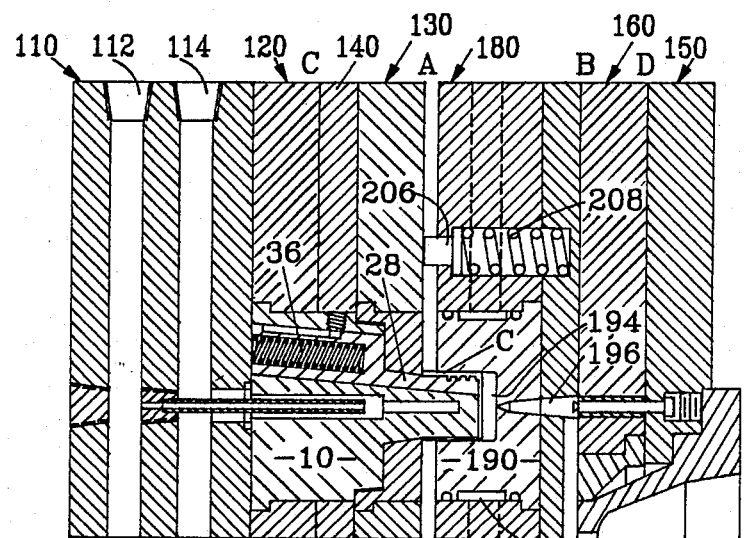
FIG. 9 is a sectional view similar to FIG. 8 but showing the base broken open between the core and cavity.
Figure 10:
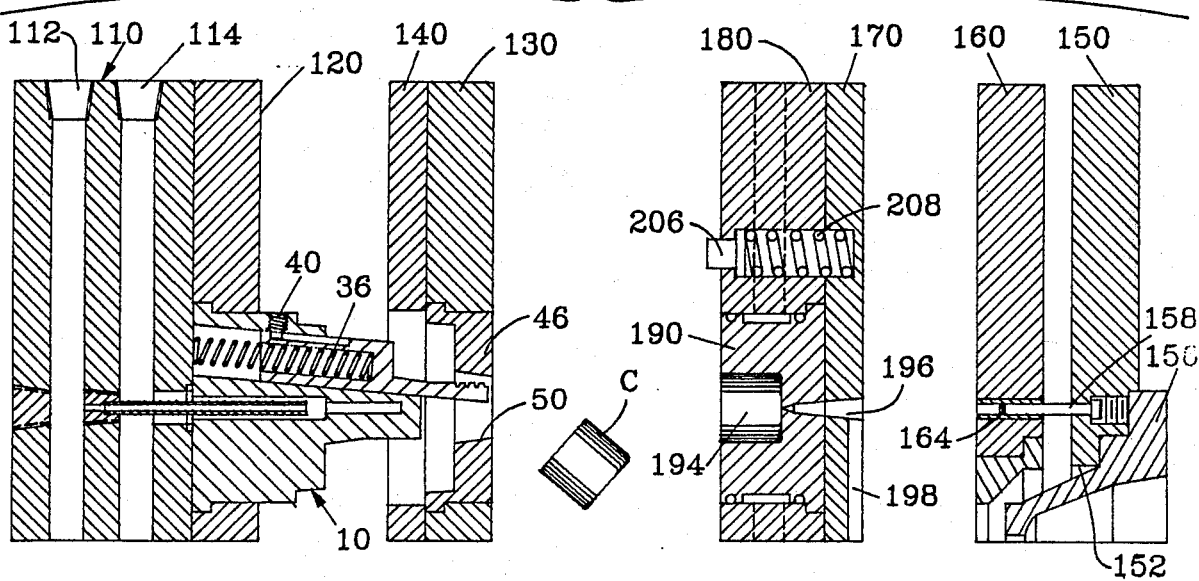
FIG. 10 shows the mold base all the way open, but for simplicity, not showing the various stripper bolts, leader pins and bushings, etc.

FIGS. 8 through 10 show the operation of the member 10 in a mold base. In the drawings, to keep things simple, there are not shown the conventional and well known leader pins and bushings which support the various mold plates and along which they slide or by which they are guided when the mold is opened or closed.

The base is shown in FIG. 8 and generally designated 100. It comprises a bottom backup plate 110 which is bolted to the back platen (not shown) of the press. Bottom backup plate 110 is formed with channels 112 and 114 respectively which provide the inlet and outlet for cooling fluid. As shown, the inlet 112 communicates through a port 116 to tube 58 which enters the recess 54 in the member 10 as described. Outlet from recess 54 communicates with appropriate seals through passage 118 to the outlet 114.

A core plate 120 is provided with an opening 122 having an annular enlargement 124 at its lower end. The core plate 120 surrounds the mold member 10 and clamps at against the bottom backup plate by bolt means (not shown).

A stripper plate 130 is similarly provided with a bore 132 to accept the stripper bushing 46. The stripper plate 130 is bolted by means (not shown) to the stripper backup plate 140 to clamp the head 49 of the stripper bushing 46 therebetween.

On the upper side of the mold base there is the top backup plate 150 which is bolted to the front platen of the press (not shown). An opening 152 in the top backup plate has secured therein the nozzle block 156 accepting the nozzle of the plastic injection machine.

A sucker pin 158 is mounted in the top backup plate 150 and extends through an opening 162 in a sucker plate 160. A small head 164 having an undercut is disposed on the end of the sucker pin 158. Adjacent the sucker plate 160 is a runner plate 170 to which is secured by means not shown a cavity plate 180.

The cavity plate 180 is provided with a bore 182 to accept a cavity or the female member 190 of the mold. The female member is clampingly held by its head 192. The female member is formed with a cavity bore 194 which communicates with a sprue channel 196 communicating in turn with a runner channel 198.

The female member or cavity 190 may be formed with a peripheral cooling channel 200 which is sealed on either side by an "O" ring received in a peripheral groove as shown. A cooling water inlet 202 and outlet 204 communicate with the channel for cooling purposes.

Finally, a spring button 206 is provided in the face of the cavity plate 180. It is urged by the spring 208 against the stripper plate 130. The recess in which the spring 208 is disposed extends partly in the runner plate 170 and partly in the cavity plate 180. The button 206 has a flange on its inner end to retain it in the cavity.

The operation of the apparatus will now be described.

With the mold base closed the plastic is injected through the nozzle 156 into the runner channel 198, through sprue channel 196 and into the cavity bore 194 surrounding the core 24. The plastic in the cavity is then permitted to cool.

After setting is complete, the press is opened. The mold first breaks at A (FIG. 9) as the spring button 208 forces a separation between the cavity plate 180 and the stripper plate 130. Because the inside of the molded closure C has threads T involving undercuts, the closure is held to the core by the thread matrices 32. The outside of the closure, having no undercuts, slips easily out of the cavity bore 194. Thus the closure stays with the core in this initial break. The plastic sprue, of course, breaks away from the closure and remains in the runner plate for an instant.

The mold next breaks at B (FIG. 9) causing the separation of the sucker plate 160 and the runner plate 170. Because the sucker pin holds the runner, the sprue plastic moves with the plate 160 and slips out of its channel 196 in the cavity plate.

Thereafter (for an instant anyway) the runner and sprue are supported in place by the head 164 on the sucker pin 158.

Next the mold base breaks at C (FIG. 9) after the break at A has progressed to a point at which it approximates the space shown in FIG. 10. The break at C is between the core plate 120 and the stripper backup plate 140. As the parts separate at C the two plates 130 and 140 carry forwardly with them the stripper bushing 46. The narrower leading end of the opening 50 in the stripper bushing engages the closure C by its open end to push it away from the core.

Figure 5:
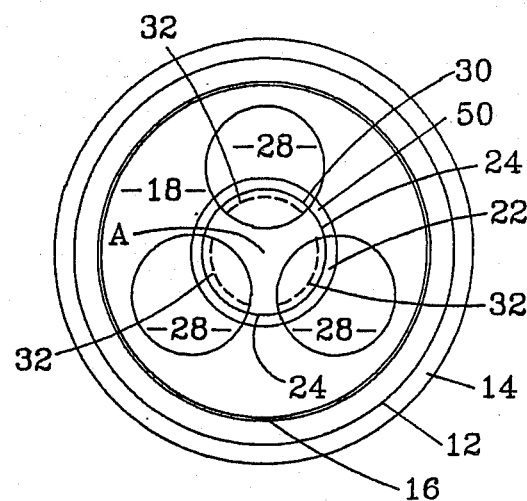
FIG. 5 is a top view of the mold member in the position shown in FIG. 4 with the stripper bushing removed.
Figure 6:
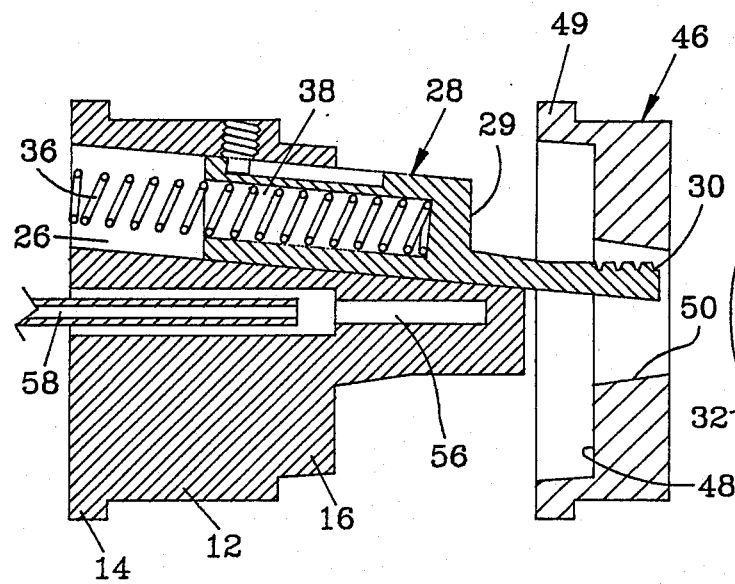
FIG. 6 is a sectional view similar to FIG. 4 but showing a blade extended as when the member is collapsed and showing the withdrawn stripper bushing.

Because of the engagement of the threads in the closure C with the undercuts on the blade components (FIG. 5) this forward movement carries with it the blades 28. As explained, the forward movement of the blades 28 along their paths inclined with respect to the center axis A collapses the blades 30 toward the axis of the male mold member. As shown in FIG. 10, the collapse of the blades eliminates the interference of the threads in the closure and the thread matrices on the blade components 30 so the closure may be stripped from the blades.

The forward movement of the blades 28 is achieved not only by the urging of the stripper bushing 46 on the closure C but also by the helper springs 36 which are under compression within the bores 26. As shown (FIG. 10) the guide screw 40 limits the forward movement of the blades.

In the final step of opening there is a break between the top backup plate 150 and the sucker pin stripper plate 160 at D (FIG. 9). This relative movement causes partial withdrawal of the sucker pin 158 from the stripper plate and sprue and causes the head 164 on the sucker pin 154 to pop out of the runner. The runner, being free with its attached sprue is permitted to fall out of the mold.

In final open position the various plates, mold member and cavity of the mold are as shown in the FIG. 10. As stated, this FIG. does not include the various leader pins and bushings, and stripper bolts by which the mold plates are laterally supported and horizontally moved.

It should be understood that in a present embodiment the mold member of the invention is used in a 4-cavity mold. The present drawings show only a single cavity of this embodiment. This is why the drawings of FIGS. 8 through 10 appear unsymetrical.

Once the closure C has been stripped off the collapsible core 10 and the sprue and runner are removed (FIG. 10), the mold may be reclosed for its next cycle. The two press platens (not shown) are forced together and the mold, when closed, appears as it does in FIG. 8. In this closing process the stripper bushing 46 moves the blades 28 to the retracted position against the bias of the helper springs. As the mold is closed, the leftward face of the stripper bushing engages the flat shoulders 29 on the end of the blades 28.

In final closed position of the mold, the blades 28 are in their retracted position and immobilized by the stripper bushing 46. The tapered bore 50 of the bushing engages and properly orients the blades 28 as it presses against the portions of the tapered seat 22 which are on the blades. It should be understood that the guide screw 40, to some extent, assures proper rotary orientation of the blades 28, but the exact rotary positions of the blades is assured by the firm seating of the tapered bore 50 against the tapered seat 29.

With the mold thus closed, plastic is shot through the nozzle 156 along the runner 198 through the sprue channel 196 and into the cavity bore 194 for beginning of the next cycle.

It should be clear from the above description that the collapsible core of the invention is characterized as having a short stroke and hence there is less need for great room in the opening of the press as with earlier collapsible cores. Further, the proper orientation of the core blade 28 is achieved in an especially effective way as the stripper bushing 50 itself seats on the tapered seat 22.

Variations of the invention are contemplated and hence the invention should not be thought of as limited to the specific embodiment shown. Rather it should be thought of in terms of the following broad claim language and reasonable equivalents thereof.

What is claimed is:

1. A mold construction for molding closures having interrupted interior threads, the construction including:
  (a) a collapsible male mold member comprising a base and an integral upstanding cylindrical core having an axis, the base extending outward from the axis to a peripheral sidewall, an annular tapered seat coaxial with the core and intermediate the base and core, the base, the seat and the core being formed with a plurality of cylindrical bores spaced inward from the peripheral sidewall and uniformly disposed about the axis and angling from the base forward toward the axis as the core is approached, a plurality of blades each having an outer end and an inner end and each having a cylindrical body, each blade being reciprocably disposed in one of the bores, each of said blades having an inward and an outward position with respect to the core, the outer ends of the blades being reduced in thickness to present sections shaped so that when the blades are in the inward position, the sections which lie adjacent the seat and the core constitute sections of the seat and core respectively and continue the peripheral surface shape of the seat and the core respectively, the sections of the blades which continue the shape of the core having thread segment matrices on their outer surfaces,
  (b) a female mold cavity receiving the core and
  (c) a stripper bushing having a tapered inner surface which fits forceably against the seat including the sections of seat on the blades when the mold is closed and serves to insure the proper rotational orientation of the blades.

2. A mold construction for molding closures as claimed in claim 1 including means to oppose the rearward movement of the blades when the bushing is seated on the seat.

3. A mold construction for molding closures as claimed in claim 1 wherein spring means bias the blades toward the outward position.

4. A mold construction for molding closures as claimed in claim 1 wherein the peripheral wall is cylindrical.

5. A mold construction for molding closures as claimed in claim 1 wherein the peripheral wall of the base of the male mold member is directly outward from the blades and a core plate supports and engages the peripheral wall.

6. A mold construction for molding closures as claimed in claim 1 wherein the blades have radial shoulders which are flush with the top of the base when the blades are in inward position and wherein the downward face of the stripper bushing rests on the shoulders during the molding operation.

7. A mold construction as claimed in claim 1 wherein there are three blades and three bores.

8. A mold construction for molding closures having a sidewall with inward protrusions, the construction including:
(a) a collapsible male mold member comprising a base and an integral upstanding cylindrical core having an axis, the base extending outward from the axis to a peripheral sidewall, the base and the core being formed with a plurality of cylindrical bores spaced inward from the peripheral sidewall and uniformly disposed about the axis and angling from the base toward the axis as the core is approached, a plurality of blades each having an outer end and an inner end and each having a cylindrical body, each blade being reciprocably disposed in one of the bores, each of said blades having an inward and an outward position with respect to the core, the outer ends of the blades being reduced in thickness to present sections shaped so that when the blades are in the inward position, the sections which lie adjacent the core constitute sections of the core and continue the peripheral surface shape of the core, an inclined seat section on each of the blades between the cylindrical body and the reduced section, the sections of the blades which constitute sections of the core having protrusion matrices on their outer surface,
(b) a female mold cavity receiving the core and
(c) a stripper bushing having a shaped inner surface which fits forceably against the seat sections on the blades when the mold is closed and serves to insure the proper rotational orientation of the blades.

9. A mold construction for molding closures as claimed in claim 8 including means to oppose the rearward movement of the blades when the bushing is seated on the seat.

* * * * *

UNITED STATES PATENT AND TRADEMARK OFFICE
CERTIFICATE OF CORRECTION

PATENT NO. : 4,938,679

DATED : July 3, 1990

INVENTOR(S) : Joseph A. Pietrorazio

It is certified that error appears in the above-identified patent and that said Letters Patent is hereby corrected as shown below:

On the title page:
Item [75], in listing of inventor's address:

Cancel "Middlebury"; insert --Woodbury--.

Signed and Sealed this

Twelfth Day of November, 1991

Attest:

HARRY F. MANBECK, JR.

*Attesting Officer*     *Commissioner of Patents and Trademarks*